No. 865,350. PATENTED SEPT. 10, 1907.
D. BERENBERG.
MEASURING APPARATUS.
APPLICATION FILED JUNE 22, 1906.
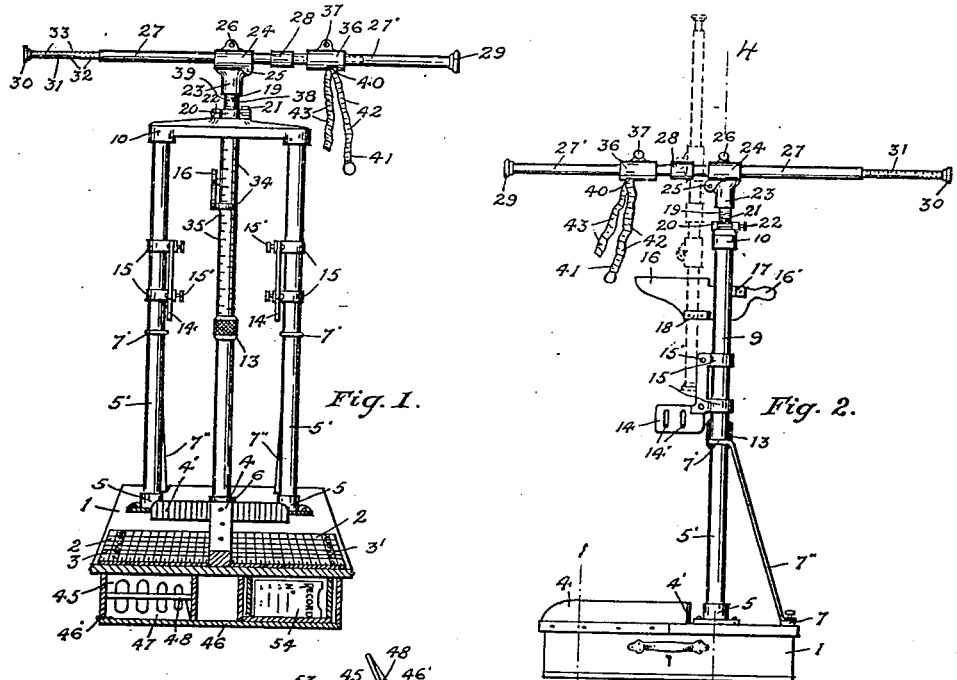
Fig. 1.
Fig. 2.
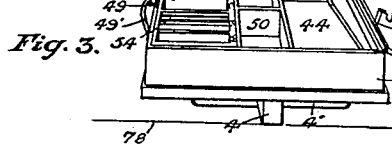
Fig. 3.
Fig. 4.
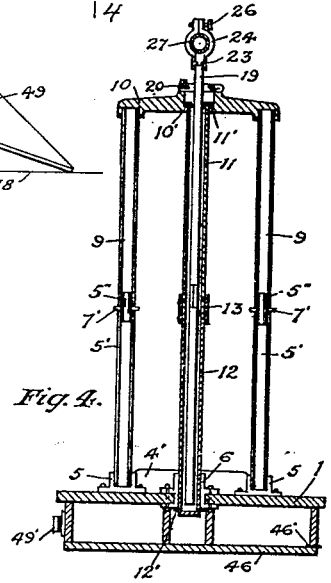
WITNESSES:
A. B. Cornelius
William M. Myers
INVENTOR
David Berenberg
BY
George W. Hinton
ATTORNEY

UNITED STATES PATENT OFFICE.

DAVID BERENBERG, OF ST. JOSEPH, MISSOURI.

MEASURING APPARATUS.

No. 865,350.  Specification of Letters Patent.  Patented Sept. 10, 1907.

Application filed June 22, 1906. Serial No. 322,948.

To all whom it may concern:

Be it known that I, DAVID BERENBERG, a citizen of the United States, residing at St. Joseph, in the county of Buchanan and State of Missouri, have invented certain new and useful Improvements in Measuring Apparatus, of which the following is a specification, reference being had therein to the accompanying drawing.

My invention relates to improvements in measuring apparatuses, for measuring persons, and especially such as are designed for the taking of measurements for identification purposes; and the objects of my improvements, are, first; to provide a measuring apparatus in which every facility shall be provided for the taking of measurements of persons, with the utmost speed, accuracy and convenience, and be formed of durable and substantial parts, so simple in construction and operation, that any one of good intelligence may successfully operate my apparatus, without any other teaching than the information obtained from a careful reading of the following specification; thus rendering personal training of the operator of my apparatus, unnecessary; second: to so construct and arrange the parts of a measuring apparatus, that they shall embody means for the compact storing and safe handling and transporting of all the detachable parts of my apparatus and also for other articles, required as accessories in the practical use of my invention, thus avoiding inconvenience in storing, handling and transporting my apparatus and said accessories. I attain these objects by the mechanism illustrated in the accompanying drawing, in which:—

Figure 1. is a front view of certain parts, in combination with a transverse section of the other parts, cut on the line 1—1, seen in Fig. 2. Fig. 2. is a side elevation. Fig. 3. is a view of the base, opened for the reception of the detachable parts, and is drawn in perspective. Fig. 4. is a transverse section, cut on the line 4—4, seen in Fig. 2., certain parts being omitted to avoid confusion.

The preferred form of my apparatus consists of a number of measuring devices, mounted on a base, in which is a number of compartments, suitably arranged for the reception of all the detachable parts of my invention, and also a compartment for the reception of other articles, required as accessories in the practical use of my apparatus, as hereinafter fully described.

The measuring devices comprise the following parts, a platform or base 1, two glass plates 2, secured on said base 1, as seen in Fig. 1., two scales of measure 3 and 3', which are made to show both English and metric systems of measurement, and are secured beneath glass plates 2, two tube footings 5, the tube footing 6 two brace footings 7, and the abutment strips 4 and 4' are rigidly secured on base 1, as seen; two tubes 5', two internal couplings 5'' having their lower parts secured in the upper ends of tubes 5', as seen in Fig. 4., two tubes 9, having their lower ends telescoped on the upper ends of couplings 5'' and their upper ends held in place in the socketed extremities of tie piece 10; tube 11, having a collar 11', secured on its upper end and adapted to support tube 11, by resting on shoulder 10', formed with tie piece 10; tube 12, having collar 12' secured thereon at its lower end, and the right and left threaded coupling 13, by which tubes 11 and 12 are screwed together, until collar 12' is drawn against the lower end of footing 6, form the frame work of the measuring devices. The two knee brackets 14, (see Fig. 2.) are each provided with two slot shaped apertures 14', for the reception of suitable straps, (not shown) and two split collars 15, provided with thumbscrews 15', for tightening collars 15 on tubes 9, form thoroughly adjustable means for securing the knees of the person, (not shown) whose measurements are to be taken. The leg bracket 16, provided with handle 16', supported by the hand of said operator, is detachably held and guided on tube 11 by its hooked shaped projections 17 and 18, which together with the English scale 34 and the metric scale 35, on tube 11, form the leg measuring means. Tube 19, slidably telescoped in tubes 11 and 12, the two piece collar 20, pivotally secured on tie piece 10 by screw 21, and thumb screw 22, for tightening collar 20 on tube 19, form vertically and rotatably adjustable means for supporting the following parts.

Secured on the upper end of tube 19 is the hinge bracket 23, on which rests and is hinged, the split sleeve, 24, provided with hinge pivot 25 and thumb screw 26, for tightening split sleeve 24 on the horizontally supported tube 27, on the right end of which is removably secured the extension tube 27', by the screw threaded coupling 28, as seen in Fig. 1. On the free end of tube 27' is secured the end piece 29, and the opposite end piece 30 is secured on the exposed end of tube 31, slidable in tubes 27 and 27' which together with the English scale 32 and the metric scale 33, on tube 31, form the arm measuring means. The head plate 36, slidable on tube 27' is adjustably secured on said tube by thumb screw 37, and together with their supports and the English scale 38 and the metric scale 39, on tube 19, form the height measuring means. In head plate 36 is the slot 40 through which is passed the tape line 41, on the one side of which is the English scale 42 and on the other side of said line is the metric scale 43, for taking the face, head, abdomen and such other measurements of said person, as may be desired. Slot 40 detachably holds tape line 41, in plain view of said operator and at a convenient height. Where tubes 19 and 31 are too long to be stored in base 1, said tubes are each formed of two pieces, coupled together by ordinary internal screw threaded couplings (not shown). The horizontal tubes 27 and 27' (seen in Fig. 1) are brought to the position indicated by dotted lines 27″, (seen in Fig. 2) by rotating sleeve 24 on its hinge pivot 25, for rendering said tubes unobstructive, when not in use.

Referring to Fig. 3., compartment 44, in base 1, holds two racks 45, (only one of which is visible) for securely storing one half of the previously described tubes, the lid 46, hinged to base 1, by hinges 46′, carries two racks 47, for storing the remaining half of said tubes, in compartment 44; leaf 48 is adapted to close to the position seen in Fig. 1. and keep said tubes in their respective racks, as described. Lid 46 is provided with any suitable lock for locking the free edge of said lid to the edge of base 1, as indicated at 49.

Referring to Fig. 3., in the base 1, are the compartments, 50, for the reception of all detachable parts, such as knee brackets 14, bracket 16, etc. In base 1 is also arranged the compartment in which is stored such accessories as are usually required for the recording and filing of measurements, of which is shown the pigeon-hole cabinet 51, in which is a series of pigeon-holes 52, provided with the alphabetical index 53, and books of record 54, are stored in said pigeon-holes, after which base 1 may be closed, lid 46 be locked, as described, and all the parts of my invention and said accessories be conveniently transported by handle 49′ which is secured on base 1.

In the operation of my invention, the person, (not shown,) and whose measurements are to be taken, is placed, usually in a nude state, standing with one foot on one of the glass plates 2, and the other foot on the other one of the glass plates 2, with the heels of said person's feet abutted by strips 4′ and the inner edges of said feet abutted by strip 4, at which time scales 3 will show length of each of said feet, while scales 3′ will show the width of each of said feet, respectively. Should it be found necessary, the previously described knee securing means are applied, and if required, the person may be strapped or otherwise secured to tie piece 10, by straps passed around the body of said person, and which are not shown. The operator, (not shown,) by handle 16′ (see Fig. 2.) applies leg bracket 16, in the position seen, projecting said bracket between the legs of said person and raises said bracket until its upper surface is stopped by contact with the trunk of said person, at which time the correct leg measurement of said person will be seen on scales 34 and 35, where the upper edge of hook 17 rests against tube 11.

The previously described parts of the height measuring devices are placed in position, as seen in Fig. 2, and adjusted to the proper position to bring the head plate, 36 over and lightly resting on the head of said person, at which time the lowest visible part of scales 38 and 39 on tube 19 will show correctly the height of said person, and said position of parts may be retained as desired by tightening thumb screw 22; with tape-line 41; desired face, head and other measurements are taken, after which, the arm measuring parts are placed in position as seen in Fig. 1 and adjusted to bring the end pieces 29 and 30 against the tips of the fingers of said person, whose arms are outstretched between said end pieces, at which time, the last visible character (next the end of tube 27) of the scales 32 and 33 will show the correct arm measurement.

I am aware that a variety of devices, having structural features, differing from mine in some respects, could be devised and while I have shown and described my invention in the foregoing manner, it is evident that I wish to reserve the right to change or modify the various parts of my invention, from time to time as circumstances may require, without departing from the spirit of my invention; therefore,

What I claim as new and desire to secure by Letters Patent is:

1. In a measuring apparatus, a platform or base, provided with suitable storing compartments therein; two scales of measure, on said base, adapted to show the respective measurements of the full length of the two feet of a person standing thereon; a plain, fixed abutment strip, adapted to abut and stop the inner sides of said feet; in combination with a plain, fixed heel abutment strip secured on said base, and two scales of measure, adapted to show the measurements of the full width of said feet; all of said scales being provided with glass coverings, secured on said base.

2. A measuring apparatus comprising a base, a braced framework detachably secured on said base, composed of two uprights and a tie piece on the upper ends of said uprights, and a tube centrally situated between said uprights, whereby said frame work is secured together; two knee securing brackets each being provided with suitable apertures for the reception of suitable straps, slidable securing means, for slidably securing said brackets, one on each of said uprights.

3. A measuring apparatus, comprising a base, a suitably braced vertical tube, detachably secured on said base, a smaller tube, provided with scales of measure thereon, and telescoped and slidable in said vertical tube, clamping means for holding said smaller tube at any desired height, a horizontal tube, adjustably secured on the upper end of said smaller tube and a head plate adjustably secured on said horizontal tube; the whole adapted to be operated as a height measuring device.

4. A measuring apparatus comprising a base, a suitably braced vertical tube, detachably secured on said base, a smaller tube, provided with scales of measure thereon, and telescoped and slidable in said vertical tube, clamping means, for holding said smaller tube at any desired height, a horizontal tube adjustably secured on the upper end of said smaller tube, a smaller horizontal tube, provided with scales of measure thereon, and slidable in said horizontal tube, and two end pieces, one of which is secured on the free end of each of said horizontal tubes; the whole adapted to be operated as an arm measuring device.

5. A measuring apparatus, comprising a base, a braced framework, detachably secured on said base, composed of two uprights, and a tie piece, on the upper ends of said uprights, a vertical tube, centrally situated between said uprights and supported by said frame-work, and provided with one or more scales of measure, thereon; in combination with a bracket, provided with a handle and means whereby said bracket may be detachably attached to and be slidable on said vertical tube, the whole adapted to be operated as a leg measuring device.

6. A measuring apparatus comprising a base, a vertical tube, suitably braced and secured on said base, a smaller tube, telescoped and slidable in said vertical tube, a horizontal tube, adjustably mounted on the upper end of said smaller tube, a head plate, provided with a slot, and slidably mounted on said horizontal tube, and a tape-line, adapted to be detachably held in said slot.

7. A measuring apparatus, comprising a base, a vertical tube, detachably braced and detachably secured on said base, a smaller tube, slidable in said vertical tube, a hinge bracket, secured on the upper end of said smaller tube, a split sleeve, hinged to said hinge bracket, a horizontal tube, slidable in, and adjustably secured in said split sleeve and measuring devices on said horizontal tube, the whole adapted to allow said horizontal tube to be brought to a vertical position, by the rotation of said hinged split sleeve, upon the hinge, by which said split sleeve is hinged to said hinge-bracket.

8. A measuring apparatus, comprising a base, two separably jointed uprights, detachably secured on said base, two braces, detachably secured to said uprights and to said base, as shown, a vertical tube, provided with suitable scales of measure thereon, and composed of two parts, adapted to be secured together by a right and left threaded coupling, a detachably jointed smaller tube, slidable in said vertical tube, a separably jointed horizontal tube detachably mounted on the upper end of said smaller tube and a smaller horizontal tube, slidable in said horizontal tube, a slotted head plate detachably and adjustably secured on said smaller horizontal tube; knee brackets, slidably and detachably secured on said uprights as shown, and a leg bracket slidable on and detachable from said vertical tube: the whole arranged to form measuring devices, detachable and separable, for storing in a minimum amount of space.

In testimony whereof I affix my signature in the presence of two witnesses.

DAVID BERENBERG.

Witnesses:
WILLIAM M. MYERS,
WILHELM WALDEMAR LAURITSEN.